(No Model.)
H. C. WEEDEN.
HIGH PRESSURE BALL COCK.
No. 515,699. Patented Feb. 27, 1894.
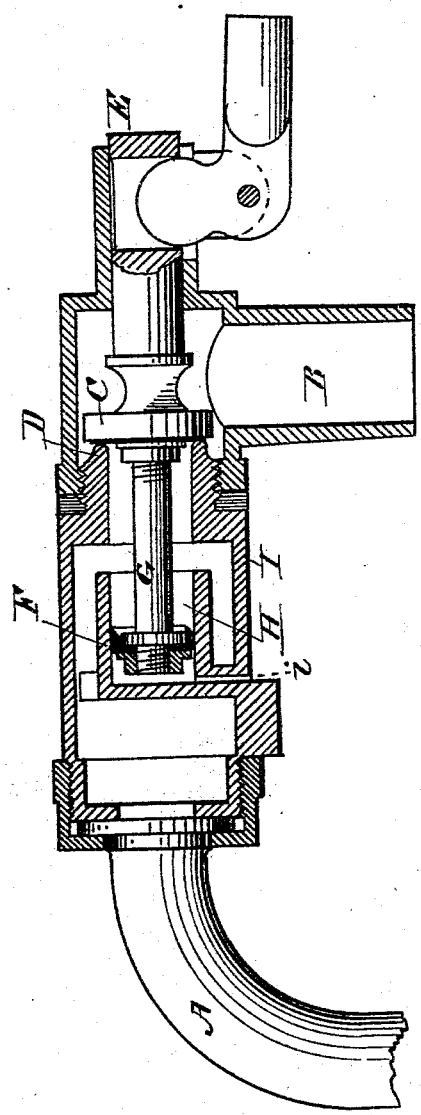
WITNESSES
John H. Taylor.
Ellen B. Tomlinson.
INVENTOR
Henry C. Weeden
by Alex. P. Browne,
attorney.

UNITED STATES PATENT OFFICE.

HENRY C. WEEDEN, OF BOSTON, MASSACHUSETTS.

HIGH-PRESSURE BALL-COCK.

SPECIFICATION forming part of Letters Patent No. 515,699, dated February 27, 1894.

Application filed June 26, 1890. Serial No. 356,888. (No model.)

*To all whom it may concern:*

Be it known that I, HENRY C. WEEDEN, a citizen of the United States, residing at Boston, in the county of Suffolk and State of Massachusetts, have invented certain new and useful Improvements in High-Pressure Ball-Cocks, of which the following is a specification.

My invention relates to improvements in ball-cocks, so called, *i. e.*, a cock or valve opening and closing a passage through which water under pressure may be admitted into a tank or other receptacle up to a certain pre-determined level and then be shut off through the agency of a float connected to another contrivance, ordinarily of the lever type, whereby the rising of the float actuates the lever, and thus forces the cock or valve into its closed position.

The object of my invention is to provide in connection with such an apparatus certain improvements adapting it for use in places where the inflowing water is under a varying or heavy pressure. Accordingly I have devised as an addition to the ball-cock, the area of whose face exposed to the water pressure when the cock is closed determines the amount of the pressure tending to open it, a part having an opposed face, connected with the ball-cock so as to move with it, and also exposed to the same water pressure upon one side only, that being the side opposite the face of the ball-cock upon which pressure is exerted when the passage is closed. In this way, as will be evident, I may obtain a balancing pressure, that is to say, assuming that the face of the ball-cock exposed to a water pressure of fifty pounds to the square inch has an area of two square inches, then if a face of similar area be provided and arranged so that the water pressure shall act against it in the direction opposite that in which it acts against the ball-cock itself, the result evidently will be a balance between the two pressures and a tendency of the ball-cock to remain closed under the pressure of flotation of its ball regardless of the pressure or head of the water supply. So constructed, it is evident that even under very heavy pressure, the ball-cock may be opened and closed with certainty by means of a comparatively small ball. In this way, not only is space gained in the tank, but also an increase in the cheapness and efficiency of the device itself.

In the accompanying drawing I have represented in section an apparatus embodying my present improvement in the form now best known to me.

In the drawing A represents the pipe by which water is supplied from the main, and B the pipe through which it is discharged into the tank.

C represents the cock or valve, and D a port upon which the valve presses when the flow of water is cut off.

E represents a spindle which carries the valve C, which spindle is supported at its outer end within a hub projecting from the discharge pipe B against which the lever, actuated by the float, bears. This construction is well known and therefore is not illustrated. As thus far described, the device is of well known construction.

In connection with the ball-cock, I provide in carrying out my present improvement a pressure balancing attachment as hereinbefore mentioned. This consists of a piston F having a spindle G connecting it with the valve C, whose spindle is practically an extension of the spindle G and supports it. The area of the face of the piston F opposite to the face of the valve C, is, as shown, substantially equal to the area of so much of that valve as is exposed to the pressure of the water when the valve is on its seat. In order that the pressure upon C should be balanced by that upon F, it is obvious that but one face of F should be exposed to the service pressure. This may be accomplished by placing the piston F within a piston chamber H, preferably formed integrally with the casing I which forms the water-way of the structure. This chamber is open toward the pressure, as shown. Within this chamber, the disk F, being suitably packed, will work substantially water-tight. To avoid a vacuum, and also to allow the escape of water, should such collect in the cylinder behind the piston, a vent $i$ may be provided extending through the casing. The device as a whole may be attached to the tank or receptacle for which it is intended in any convenient well known manner.

It will be obvious that with a device constructed as herein described, the pressure upon the two disks C and F being exerted in opposite directions will tend to equalize itself, and therefore the weight of the ball float in descending and its pressure of flotation in ascending will be efficient to open and close the valve with ease and certainty, even when used in connection with service water under high pressure.

The area of the disk F relatively to that of the disk C may be varied to give the amount of balance, whether entire or partial, which the apparatus may call for in practice.

I claim—

A valve consisting of a casing forming a water-way, a port D therein forming a valve seat, a piston-chamber H supported within the water-way on the pressure side of the port and open to the pressure, a discharge-pipe B attached to the casing adjacent to the said port, a piston F movable in the said piston-chamber, a valve C to open and close the port D on its escape side, a valve stem E therefor, supported in a projection from the discharge-pipe B, a float-lever engaging with the said valve stem, and a stem G connecting the piston F with the valve stem E, as set forth.

In testimony whereof I have hereunto subscribed my name this 6th day of June, A. D. 1890.

HENRY C. WEEDEN.

Witnesses:
JOHN H. TAYLOR,
ELLEN B. TOMLINSON.